(12) United States Patent
Rodriguez et al.

(10) Patent No.: US 9,087,275 B2
(45) Date of Patent: Jul. 21, 2015

(54) GENERATING A HYBRID QUICK RESPONSE (QR) CODE

(71) Applicant: LENOVO ENTERPRISE SOLUTIONS (SINGAPORE) PTE. LTD., Singapore (SG)

(72) Inventors: Adrian X. Rodriguez, Durham, NC (US); Felicia N. Soto, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/104,498

(22) Filed: Dec. 12, 2013

(65) Prior Publication Data

US 2015/0161496 A1 Jun. 11, 2015

Related U.S. Application Data

(63) Continuation of application No. 14/102,902, filed on Dec. 11, 2013.

(51) Int. Cl.
G06K 19/06 (2006.01)

(52) U.S. Cl.
CPC .... *G06K 19/06037* (2013.01); *G06K 19/06112* (2013.01)

(58) Field of Classification Search
CPC .................. G06K 19/06067; G06K 19/06112
USPC .................. 235/494, 462.01, 462.08, 462.09
See application file for complete search history.

(56) References Cited

U.S. PATENT DOCUMENTS

| | | | |
|---|---|---|---|
| 6,082,620 A | 7/2000 | Bone, Jr. | |
| 2009/0166438 A1 | 7/2009 | Sanchez et al. | |
| 2012/0128267 A1 | 5/2012 | Dugan et al. | |
| 2012/0131416 A1* | 5/2012 | Dugan et al. | 714/760 |
| 2013/0032634 A1 | 2/2013 | McKirdy | |
| 2013/0035787 A1 | 2/2013 | Canter | |
| 2013/0068673 A1 | 3/2013 | Maggiore et al. | |
| 2013/0071029 A1 | 3/2013 | Terwilliger et al. | |
| 2013/0087608 A1 | 4/2013 | Addy et al. | |
| 2013/0087609 A1 | 4/2013 | Nichol et al. | |
| 2013/0092730 A1 | 4/2013 | Blinbaum | |
| 2013/0112760 A1 | 5/2013 | Schory et al. | |
| 2014/0122274 A1 | 5/2014 | Argue et al. | |
| 2014/0263607 A1 | 9/2014 | Mindeman et al. | |

FOREIGN PATENT DOCUMENTS

JP 2009/140204 A 6/2009

OTHER PUBLICATIONS

Anonymous, "Create a specific QR code from product error messages that could be scanned into a device and used for support", IP.com Prior Art Database, Sep. 20, 2010, pp. 1-2, IP.com (online publication), IP No. IPCOM000199891D, USA, URL: http://ip.com/IPCOM/000199891.

* cited by examiner

*Primary Examiner* — Kristy A Haupt
(74) *Attorney, Agent, or Firm* — Edward J. Lenart; Katherine S. Brown; Kennedy Lenart Spraggins LLP

(57) ABSTRACT

An apparatus supporting hybrid quick response (QR) codes may include: a computer chassis; a dynamic display on the exterior of the computer chassis, the dynamic display configured to render dynamic QR code portions; and a static display that includes static QR code portions, where the static display is adapted to the chassis such that the static QR code portions and dynamic QR code portions rendered by the dynamic display comprise a single, hybrid scannable QR code.

7 Claims, 5 Drawing Sheets

GENERATING A HYBRID QUICK RESPONSE (QR) CODE

CROSS-REFERENCE TO RELATED APPLICATION

This application is a continuation application of and claims priority from U.S. patent application Ser. No. 14/102,902, filed on Dec. 11, 2013.

BACKGROUND OF THE INVENTION

1. Field of the Invention

The field of the invention is data processing, or, more specifically, methods and apparatus for generating a hybrid QR code and apparatus including a hybrid QR code.

2. Description of Related Art

Quick Response (QR) codes are often affixed to various computing devices and utilized to encode a Uniform Resource Locator (URL) that, when accessed by a user, provides information describing the computing device. Such QR codes are typically static and often provided in user manuals and the like. Some static QR codes may be affixed, in sticker form, to a server or other computing device. Such static QR codes, however, do not provide real time information regarding the operating state of the server.

Dynamic displays, such Liquid Crystal Displays (LCDs), are also often utilized to render a QR code. Such dynamic displays of QR codes may provide more real-time information regarding the operation of a particular computing device, but when power is removed, the display provides no QR code whatsoever. In these two instances, QR codes are either entirely static, as in the case of a printed publication or a sticker, or entirely dynamic, as in the case of an LCD.

SUMMARY OF THE INVENTION

Apparatus including a hybrid Quick Response (QR) code are disclosed in this specification. Such an apparatus includes a computer chassis; a dynamic display on the exterior of the computer chassis, the dynamic display configured to render dynamic QR code portions; a static display that includes static QR code portions, the static display adapted to the chassis such that the static QR code portions and dynamic QR code portions rendered by the dynamic display comprise a single, hybrid scannable QR code.

Methods and apparatus for generating a Quick Response (QR) code are also disclosed in this specification. Generating such a QR code may include: identifying, for a plurality of error codes capable of being displayed as a QR code, portions of a display that remain static for each QR code; and generating a static display that comprises each of the identified static portions.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
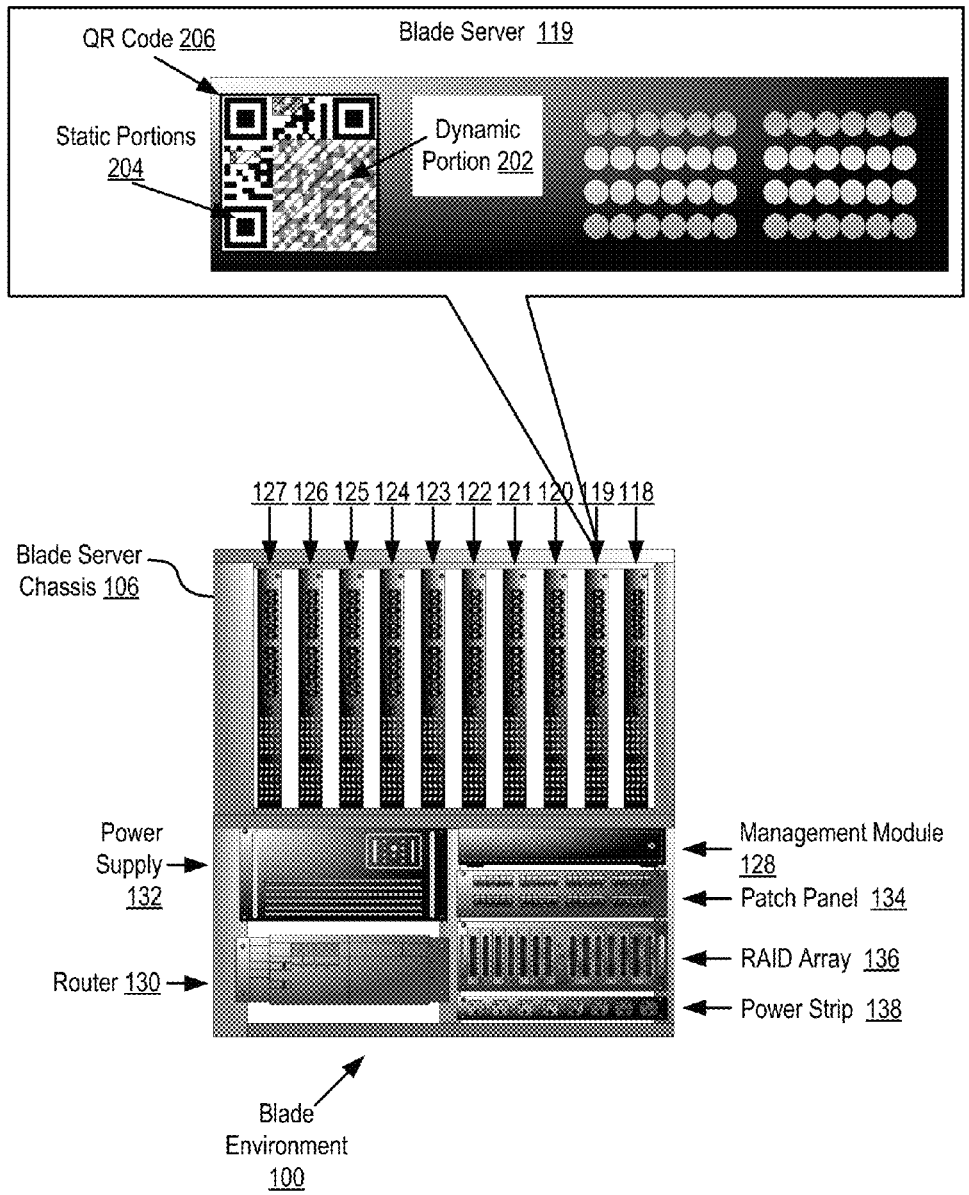
FIG. 1 sets forth a block diagram of an example data center than includes a blade environment configured with one or more blade servers that include a QR code generated according to embodiments of the present invention.

Exemplary methods, apparatus, and products for generating a hybrid QR code in accordance with the present invention are described with reference to the accompanying drawings, beginning with FIG. 1. FIG. 1 sets forth a block diagram of an example data center than includes a blade environment (100) configured with one or more blade servers that include a QR code generated according to embodiments of the present invention. Examples of such blade environments may include the Blade System from HP, the BladeCenter from IBM®, and others as will occur to those of skill in the art.

The blade environment (100) in the example of FIG. 1 includes a blade server chassis (106) housing a number of blade servers (118-127). Blade servers (118-127) are installed in blade server chassis (106). A blade server chassis is an enclosure in which blade servers as well as other electrical components are installed. The chassis provides cooling for servers, data communications networking connections, input/output device connections, power connections, and so on as will occur to those of skill in the art. One example blade server chassis is IBM's BladeCenter. An IBM BladeCenter E includes 14 blade slots, a shared media tray with an optical drive, floppy drive, and Universal Serial Bus ('USB') port, one or more management modules, two or more power supplies, two redundant high speed blowers, two slots for Gigabit Ethernet switches, and two slots for optional switch or pass-through modules such as Ethernet, Fibre Channel, InfiniBand or Myrinet 2000 modules. A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade server chassis (DC power) virtualized (iSCSI storage, remote console over IP), or discarded entirely (serial ports). The blade itself becomes simpler, smaller, and amenable to dense installation with many blade servers in a single blade server chassis.

One of the blade servers (119) includes a display configured to depict a QR code (206). A QR code is a matrix barcode (or two-dimensional barcode) first designed for the automotive industry in Japan. A barcode is an optically machine-readable label that is attached to an item and that records information related to that item. The information encoded by a QR code may be made up of four standardized types ("modes") of data (numeric, alphanumeric, byte/binary, kanji) or, through supported extensions, virtually any type of data. The QR Code system has become popular outside the automotive industry due to its fast readability and greater storage capacity compared to standard UPC barcodes. Applications include product tracking, item identification, time tracking, document management, general marketing, and much more. A QR code consists of black modules (square dots) arranged in a square grid on a white background, which can be read by an imaging device (such as a camera) and processed using Reed-Solomon error correction until the image can be appropriately interpreted. Data is then extracted from patterns present in both horizontal and vertical components of the image.

The QR code display of the blade server (119) includes a dynamic display on the exterior of the server. The dynamic display is configured to render dynamic QR code portions (202), depicted in FIG. 1 as shaded rectangles or squares. The term 'dynamic' as used in this specification to describe QR code portions refers to a portion of a QR code which may be changed over time so that one QR code is displayed, followed by a change in the dynamic portions, and then another QR code is displayed. The dynamic display may be implemented in a variety of ways including as an LCD (Liquid Crystal Display).

The QR code (206) on the blade server (119) of FIG. 1 also includes a static display that includes static QR code portions (204). The term 'static' here refers to portions of a QR code that do not change over time. Such a static portion of the display may be implemented in a variety of ways, including, for example, as a sticker adhered to the exterior the blade server's (119) chassis. The static display is adapted to the chassis of the blade server such that the static QR code portions and dynamic QR code portions rendered by the dynamic display comprise a single, hybrid scannable QR code. The term 'hybrid' here refers to the combination of a dynamic portion and a static portion of a QR code to form a single scannable QR code.

In addition to the single hybrid QR code, the static QR code portions may form a unique, scannable QR code. That is, when the dynamic display renders no dynamic portions (the dynamic display is completely off), the static portions may be configured to act as a scannable QR code.

In this way, a plurality of hybrid QR codes (206) may be displayed through use of the dynamic portions in combination with the static portions. Each separate hybrid QR code may be encoded with a URL that describes a different error condition. Also, the static portions, even when the dynamic portions are not displayed, may be encoded with a URL that includes basic information describing the blade server. Thus, even when the power to a particular blade server is unavailable, some information may be accessed from the static QR code portions (204).

In addition to the blade servers (109-127), the blade server chassis (104, 106) in the example of FIG. 1 also house several other electrical components including a power supply (132), a data communications router (130), a patch panel (134) a RAID array (136), a power strip (138) and a management module (128).

A management module is an aggregation of computer hardware and software that is installed in a data center to provide support services for computing devices, such as blade servers. Support services provided by the management module (128) include monitoring health of computing devices and reporting health statistics to a system management server, power management and power control, save and restore configurations, discovery of available computing devices, event log management, memory management, and so on. An example of a management module is IBM's Advanced Management Module ('AMM').

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Generating a hybrid QR code in accordance with the present invention is generally implemented with computers, that is, with automated computing machinery. For further explanation, therefore, FIG. 2 sets forth a block diagram of automated computing machinery comprising an example computer (152) useful in generating a hybrid QR code according to embodiments of the present invention. The computer (152) of FIG. 2 includes at least one computer processor (156) or 'CPU' as well as random access memory (168) (RAM') which is connected through a high speed memory bus (166) and bus adapter (158) to processor (156) and to other components of the computer (152).

Figure 2:
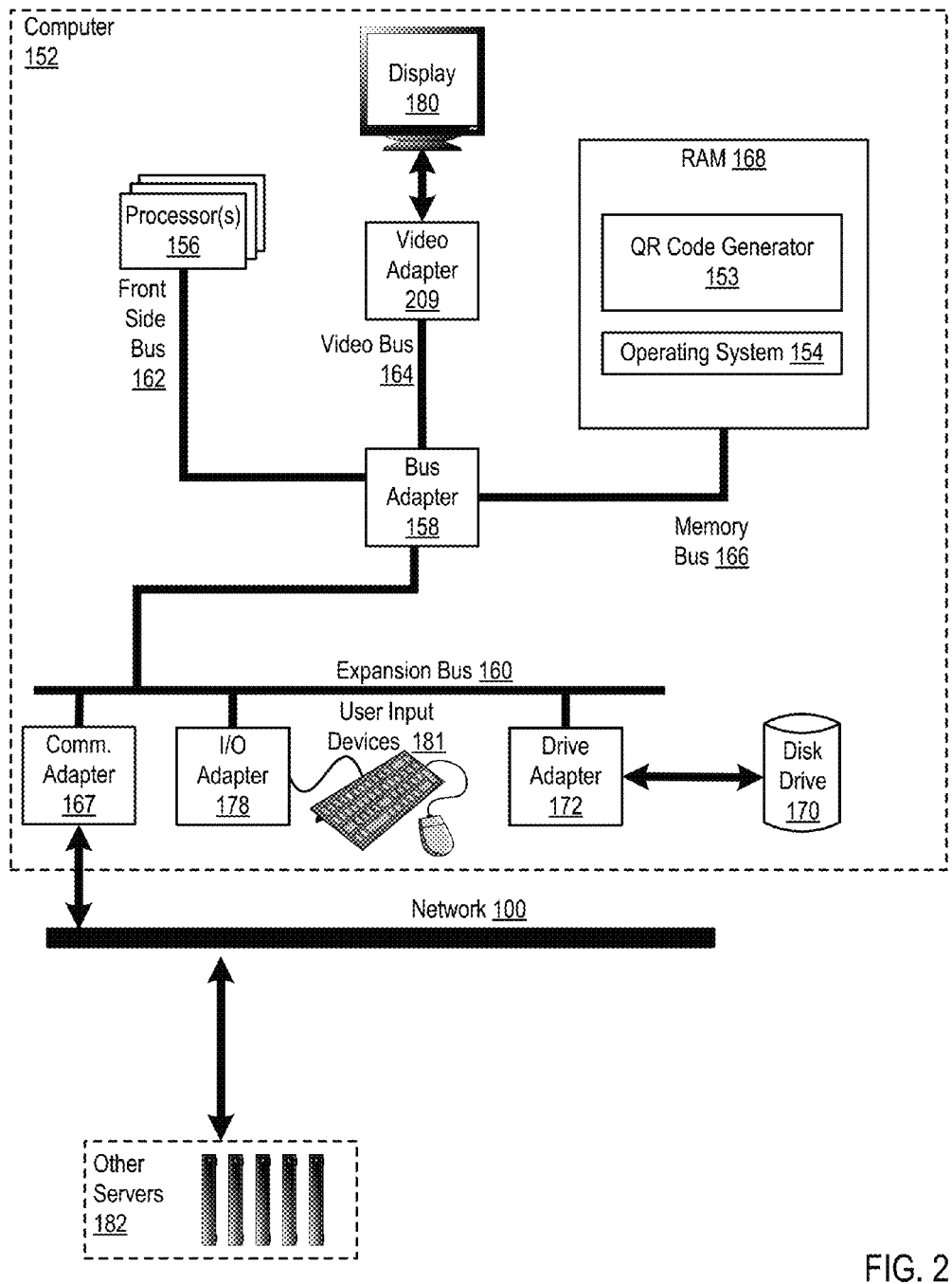
FIG. 2 sets forth a block diagram of automated computing machinery including an example computer useful in generating a hybrid QR code according to embodiments of the present invention.

Stored in RAM (168) is a QR code generator (153), a module of computer program instructions that, when executed, cause the computer (152) of FIG. 2 to generate a QR code in accordance with embodiments of the present invention. The QR code generator (153) may generate a QR code in accordance with embodiments of the present invention by identifying, for a plurality of error codes capable of being displayed as a QR code, portions of a display that remain static for each QR code.

The QR code generator (153) may identify portions of the display that remain static for each QR code, by first identifying the plurality of error codes capable of being displayed as a QR code. Identifying a static portion may be carried out either by tracking those portions that do not change for each of the QR codes or tracking the portions that do change and all other portions can be considered static.

Identifying the error codes capable of being displayed may be carried out by determining a number of error codes to be displayed, identifying a range of Uniform Resource Locators (URLs) for the identified number of error codes to be displayed, and identifying a number of QR code permutations for the range of URLs. All of the error codes, at this point in generating a hybrid QR code, need not be associated with a particular error. Instead, some of the codes may be reserved for future use. Consider, for example, a system that at the moment includes 20 error codes. It may be useful to reserve another 20 error codes so that the QR code display is capable of displaying a total of 40 unique error codes.

Finally, the QR code generator (153) in the example of FIG. 2 may generate a static display that comprises each of the identified static portions. Generating such as static display may include storing a data structure representing the static display. Once generated the QR code generator (153) may also print a static QR code display that includes the static portions. In some embodiments, printing the static QR code display includes printing a sticker that includes the static portions.

Once printed, a user, or machine configured for such application, may adhere the static QR code display to an area proximate to a dynamic display of a computer system. In some embodiments, the static QR code display may be adhered so that some of the static portions border at least one side of the dynamic display of the computer system. Consider, for example, a square LCD as a dynamic display. In such an example, the static display may be implemented as a sticker that can be adhered so that the sticker abuts two sides of the LCD. In some embodiments, the sticker may have one or more portions removed so that the sticker may be adhered directly on the LCD screen and the LCD may display dynamic portions of QR codes within the removed portions of the static display.

Also stored in RAM (168) is an operating system (154). Operating systems useful in systems configured for generating a hybrid QR code according to embodiments of the present invention include UNIX™, Linux™, Microsoft XP™, AIX™, IBM's i5/OS™, and others as will occur to those of skill in the art. The operating system (154) and QR code generator (153) in the example of FIG. 2 are shown in RAM (168), but many components of such software typically are stored in non-volatile memory also, such as, for example, on a disk drive (170).

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for generating a hybrid QR code according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for generating a hybrid QR code according to embodiments of the present invention include modems for wired dial-up communications, Ethernet (IEEE 802.3) adapters for wired data communications, and 802.11 adapters for wireless data communications.

Figure 3:
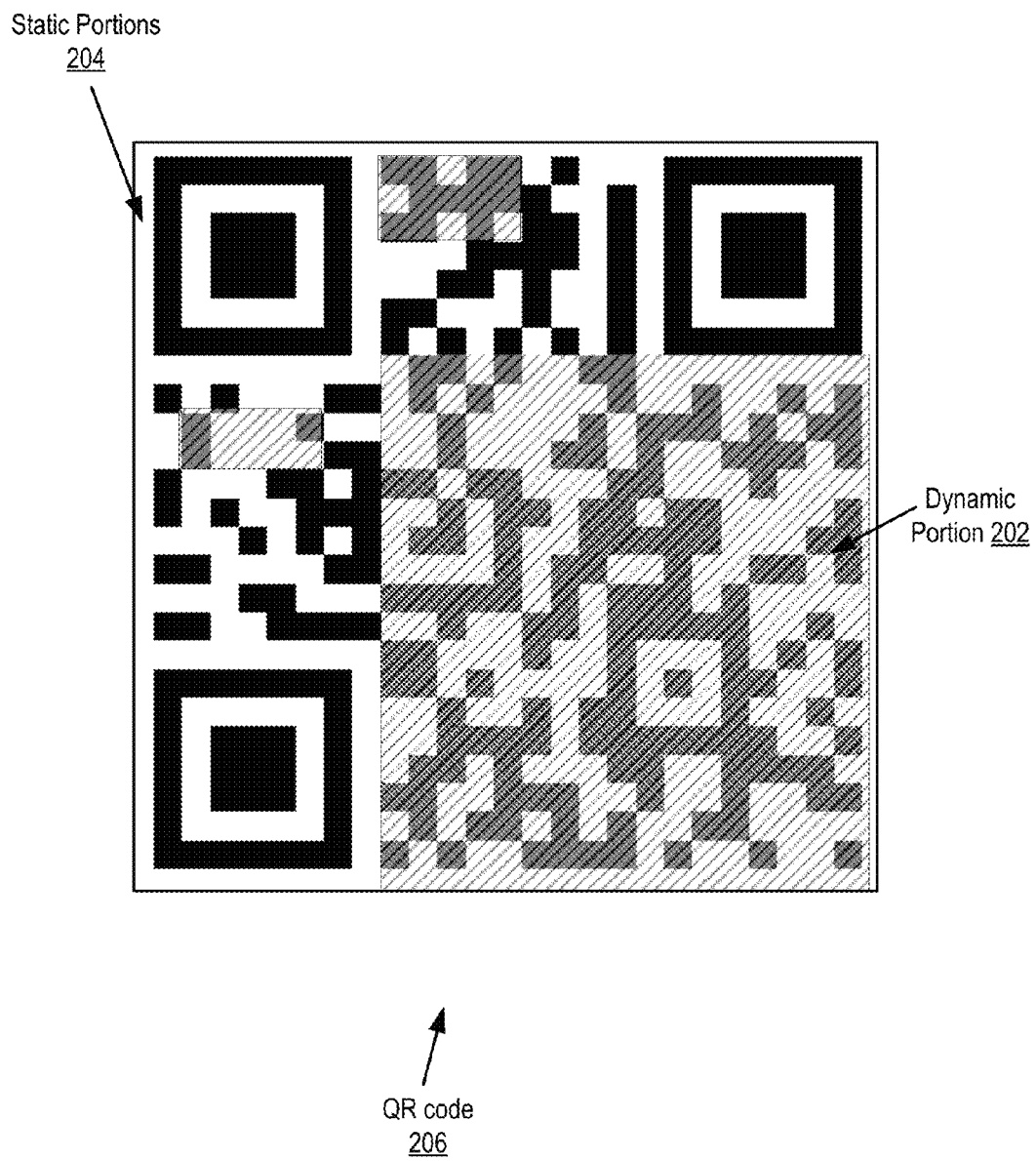
FIG. 3 sets forth an example QR code.

For further explanation, FIG. 3 sets forth an example QR code. When generating the QR code (206) in the example of FIG. 3, a QR code generator (similar to that of FIG. 2), may identify, for a plurality of error codes capable of being displayed as a QR code, portions (204) of a display that remain static for each QR code. Readers will understand that the example QR code (206) of FIG. 3 is but one among many possible QR codes capable of being displayed for the plurality of errors. A QR code generator modified according to embodiments of the present invention will cycle through all of the possible QR codes capable of being displayed for the plurality of error codes to identify the static (204) and dynamic portions (202).

The static portions (204) of the QR code (206) in the example of FIG. 3, are depicted without any shading. Those static portions (204) do not change from QR code to QR code when displaying the error codes. By contrast, the dynamic portions (202), represented in the example of FIG. 3 by the shaded portions, do change from QR code to QR code. The QR code generator may then generate a static display that includes each of the identified static portions (204).

Figure 4:
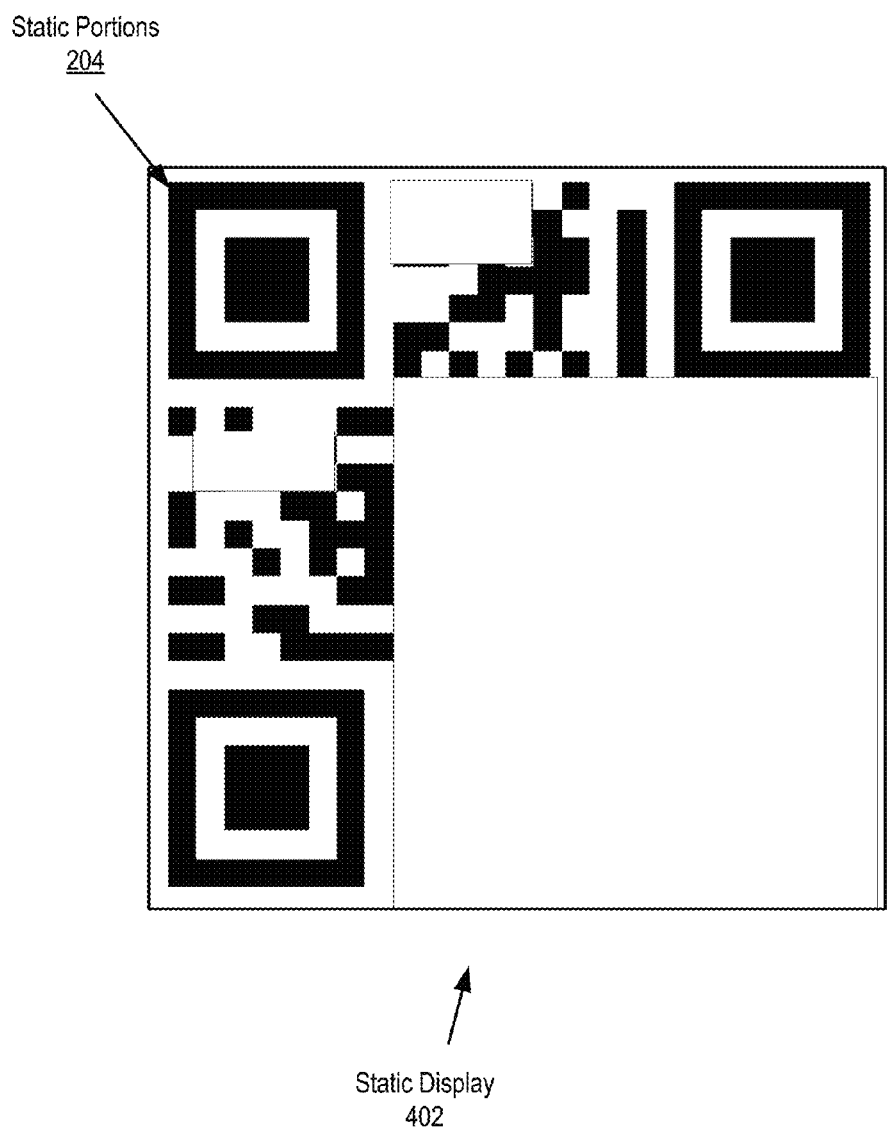
FIG. 4 sets forth an example static display for a QR code generated according to embodiments of the present invention.

For further explanation, therefore, FIG. 4 sets forth an example static display for a QR code generated according to embodiments of the present invention. Once the static portions of the QR code are generated, the QR code generator may print a static QR code display (402) that includes the static portions (204). When the static display (402) is adhered to a computer system to an area proximate to a dynamic display of the computer system, the dynamic display will be viewable through the white space depicted in the example of FIG. 4. The example static display of FIG. 4 may be implemented as sticker. Once adhered, the dynamic display may be utilized to display dynamic portions of a QR code and the dynamic portions along with the static portions (204) may implement a single, hybrid QR code.

Figure 5:
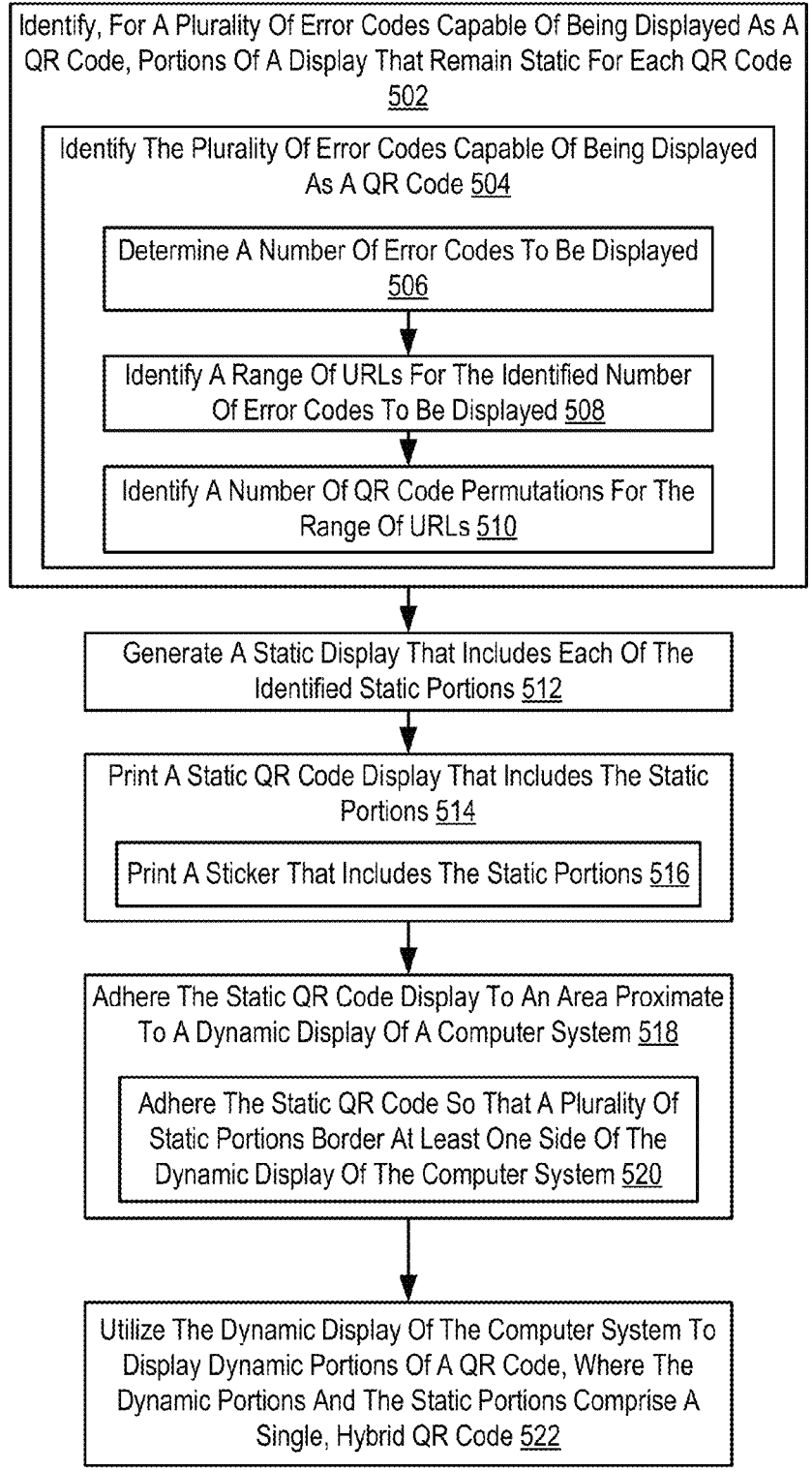
FIG. 5 sets forth a flow chart illustrating an exemplary method for generating a hybrid QR code according to embodiments of the present invention.

For further explanation, FIG. 5 sets forth a flow chart illustrating an exemplary method for generating a hybrid QR code according to embodiments of the present invention. The method of FIG. 5 includes generating identifying (502), for a plurality of error codes capable of being displayed as a QR code, portions of a display that remain static for each QR code. The error codes may include a plurality of predefined error codes assigned to errors and a plurality of error codes reserved for assignment to errors. In the example of FIG. 5, identifying (502) portions of a display that remain static for each QR code includes identifying (504) the plurality of error codes capable of being displayed as a QR code. Identifying (504) the error codes capable of being displayed as a QR code in the method of FIG. 5 may be carried out by determining (506) a number of error codes to be displayed, identifying (508) a range of URLs for the identified number of error codes to be displayed, and identifying (510) a number of QR code permutations for the range of URLs.

The method of FIG. 5 also includes generating (512) a static display that comprises each of the identified static portions. Generating (512) a static display that comprises each of the identified static portions may be carried out by a storing a data structure in memory that includes information specifying the static portions of the static display. In some embodiments, the static portions of the static display form a unique, scannable QR code.

The method of FIG. 5 may include printing (514) a static QR code display that includes the static portions and adhering (518) the static QR code display to an area proximate to a dynamic display of a computer system. Printing (514) a static QR code display that includes the static portions may be carried out by printing (516) the static QR code display includes printing a sticker that includes the static portions. Adhering (518) the static QR code display to an area proximate to a dynamic display of a computer system may be carried out by adhering (520) the static QR code so that a plurality of static portions border at least one side of the dynamic display of the computer system.

The method of FIG. 5 also includes utilizing (522) the dynamic display of the computer system to display dynamic portions of a QR code, where dynamic portions and the static portions form a single, hybrid QR code. Utilizing (522) the dynamic display to display dynamic portions of a QR code such that the dynamic and static portions form a single, hybrid QR code may be carried out by displaying a QR code for any one of the error codes, where the QR code for such an error code is encoded with a URL that, when accessed, includes information describing the error assigned to the error code.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of generating a hybrid Quick Response (QR) code, the method comprising:
   identifying portions of a display that remain static for each of a plurality of QR codes, where each of the plurality of QR codes represents one of a plurality of error codes; and
   generating a static display that comprises each of the identified static portions.

2. The method of claim 1 further comprising:
   printing a static QR code display that includes the static portions;
   adhering the static QR code display to an area proximate to a dynamic display of a computer system; and
   utilizing the dynamic display of the computer system to display dynamic portions of a QR code, wherein the dynamic portions and the static portions comprise a single, hybrid QR code.

3. The method of claim 2 wherein:
   printing the static QR code display includes printing a sticker that includes the static portions.

4. The method of claim 2 wherein:
   adhering the static QR code display to an area proximate to a dynamic display of a computer system comprises adhering the static QR code so that a plurality of static portions border at least one side of the dynamic display of the computer system.

5. The method of claim 1 wherein:
   the error codes comprise a plurality of predefined error codes assigned to errors and a plurality of error codes reserved for assignment to errors.

6. The method of claim 1 wherein identifying portions of a display that remain static for each of a plurality QR codes, further comprises:
   identifying the plurality of error codes capable of being displayed as a QR code including:
   determining a number of error codes to be displayed;
   identifying a range of Uniform Resource Locators (URLs) for the identified number of error codes to be displayed; and
   identifying a number of QR code permutations for the range of URLs.

7. The method of claim 1 wherein:
   the static portions of the static display comprise unique, scannable QR code.

* * * * *